United States Patent
Katayama et al.

(10) Patent No.: US 6,808,671 B2
(45) Date of Patent: Oct. 26, 2004

(54) METHOD FOR MANUFACTURING FUEL HOSE AND ULTRAVIOLET CROSSLINKING COMPOSITION USED THEREFOR

(75) Inventors: Kazutaka Katayama, Aichi-ken (JP); Takehiko Taguchi, Aichi-ken (JP); Naotoshi Miyahara, Aichi-ken (JP)

(73) Assignee: Tokai Rubber Industries, Ltd., Komaki (JP)

( * ) Notice: Subject to any disclaimer, the term of this patent is extended or adjusted under 35 U.S.C. 154(b) by 288 days.

(21) Appl. No.: 09/940,786

(22) Filed: Aug. 29, 2001

(65) Prior Publication Data

US 2002/0043744 A1 Apr. 18, 2002

(30) Foreign Application Priority Data

Aug. 31, 2000 (JP) ......................... 2000-263784
Jun. 28, 2001 (JP) ......................... 2001-197111
Aug. 16, 2001 (JP) ......................... 2001-247345

(51) Int. Cl.[7] ................................................ B29C 47/06
(52) U.S. Cl. .................. 264/477; 264/495; 264/171.13
(58) Field of Search ................................ 264/477, 495, 264/171.13, 173.16; 522/83, 120, 121; 138/140

(56) References Cited

U.S. PATENT DOCUMENTS

| | | | |
|---|---|---|---|
| 3,261,888 A | * 7/1966 | Cornell et al. | ............... 525/263 |
| 4,447,582 A | * 5/1984 | Gros | ........................... 525/279 |
| 4,603,158 A | 7/1986 | Markham et al. | ........... 524/100 |
| 4,994,344 A | 2/1991 | Kurtz et al. | ................. 430/273 |
| 5,993,922 A | 11/1999 | Babrowicz et al. | ........ 428/35.7 |
| 6,261,657 B1 | * 7/2001 | Ainsworth et al. | ...... 428/36.91 |
| 2002/0043744 A1 | * 4/2002 | Katayama et al. | .......... 264/477 |
| 2003/0188793 A1 | * 10/2003 | Kanbe et al. | ............... 138/126 |

FOREIGN PATENT DOCUMENTS

| | | |
|---|---|---|
| EP | 0921152 A2 | 6/1999 |
| FR | 2766548 | 1/1999 |
| JP | 09-249721 | 9/1997 |

OTHER PUBLICATIONS

Chemical Abstracts vol. 112, No. 20; May 4, 1990; Abstract No. 181121; "Photocrosslinking of EPDM elastomers: photocrosslinkable compositions", *Rubber Chemistry and Technology*, vol. 64, No. 4. (1989) pp. 592–608.

European Search Report dated Nov. 28, 2001.

* cited by examiner

*Primary Examiner*—Mark Eashoo
(74) *Attorney, Agent, or Firm*—Armstrong, Kratz, Quintos, Hanson & Brooks, LLP

(57) ABSTRACT

A method for manufacturing a fuel hose which can efficiently produce heat-resistant and flexible fuel hoses. The method for manufacturing a fuel hose forms a protector layer on an outer peripheral surface of a resinous inner layer, and includes the steps of extruding an ultraviolet crosslinking composition for a protector layer that contains the following components A to D, on the outer peripheral surface of the resinous inner layer; and subsequently, irradiating ultraviolet rays to polymerize the ultraviolet crosslinking composition, thus forming the protector layer:
(A) ethylene-propylene-diene rubber;
(B) acrylate-based monomer;
(C) silica; and
(D) photopolymerization initiator.

8 Claims, 2 Drawing Sheets

METHOD FOR MANUFACTURING FUEL HOSE AND ULTRAVIOLET CROSSLINKING COMPOSITION USED THEREFOR

BACKGROUND OF THE INVENTION

1. Field of the Invention

The present invention relates to a method for manufacturing a fuel hose and an ultraviolet crosslinking composition used therefor, and specifically relates to a method for manufacturing a fuel hose for a car and an ultraviolet crosslinking composition used therefor.

2. Description of the Art

Generally, fuel hoses for cars are roughly divided into rubber hoses having a rubber layer as a base, and resin hoses having a resin layer as a base. Due to their lighter weights, the use of resin hoses has been increasing. An outer peripheral surface of a resin hose has a protector layer (outer skin) to resist the impact of stones and to thereby protect fuel (oil or the like) contained in the hose. A material for forming the protector layer (outer skin) is, for instance, rubber, flexible polyvinyl chloride, various types of thermoplastic elastomers (TPE), or the like.

However, when rubber is used to form a protector layer, hoses cannot be continuously manufactured and the productivity is low due to a batch processing in which rubber is coated on an outer peripheral surface of a resin layer and a hose is subsequently cut therefrom into a predetermined length and then the rubber heated and crosslinked (vulcanized). Moreover, since the resin layer is deformed (molten resin) because of high temperature during the heating and vulcanizing process, the material forming the resin layer is limited to a heat-resistant material, for example, engineering plastic. General-purpose resins such as polyethylene or the like cannot be used, and therefore the costs for the hose are increased.

On the other hand, when flexible polyvinyl chloride or TPE is used to form a protector layer, heating and vulcanizing become unnecessary. It is also unnecessary to cut the hose into a predetermined length in the middle of production. Thus, hoses can be continuously produced, and the productivity is superior. However, since polyvinyl chloride or TPE is not crosslinked, it cannot be used at a temperature higher than its softening point and its heat-resistance is inferior. Moreover, when polyvinyl chloride or TPE is exposed to fire, it liquefies into drops. Thus, not only is its flame resistance low, but it may also cause falling globules of flaming material. If polyvinyl chloride or TPE ignites, an evacuation period would be extremely short. Its dropping-resistance is inferior, which is also troublesome. Additionally, flexible polyvinyl chloride or TPE has a problem in that it has less flexibility than vulcanized rubber.

SUMMARY OF THE INVENTION

Accordingly, it is an object of the present invention to provide a method for manufacturing a fuel hose that can efficiently produce a heat-resistant and flexible fuel hose and an ultraviolet crosslinking composition used therefor.

In order to achieve the above object, a method for manufacturing a fuel hose according to a first aspect of the present invention forms a protector layer on an outer peripheral surface of a resinous inner layer, the method including the steps of extruding an ultraviolet crosslinking composition for a protector layer which contains the following components A to D, onto the outer peripheral surface of the resinous inner layer; and irradiating ultraviolet rays to polymerize the ultraviolet crosslinking composition, thus forming a protector layer:

(A) ethylene-propylene-diene rubber;
(B) acrylate-based monomer;
(C) silica; and
(D) photopolymerization initiator.

An ultraviolet crosslinking composition for use in the method for manufacturing a fuel hose in the first aspect, according to a second aspect of the present invention, contains the following components A to D:

(A) ethylene-propylene-diene rubber;
(B) acrylate-based monomer;
(C) silica; and
(D) photopolymerization initiator.

In other words, the present inventors repeated thorough studies mostly on a material for forming a protector layer so as to provide an efficient method for manufacturing a heat-resistant and flexible fuel hose. First, they thought that batch processing might become unnecessary and continuous production might be possible as rubber can be vulcanized by ultraviolet irradiation with the use of a photopolymerization initiator. Thus, they further repeated studies mainly on rubber materials. Then, they directed their attention to relatively economical ethylene-propylene-diene rubber (EPDM), among other rubbers, and thought good results might be obtained if both EPDM and an acrylate-based monomer were used and crosslinked by ultraviolet rays after being mixed with a photopolymerization initiator. However, they found that EPDM is not compatible with an acrylate-based monomer, and kneadability is inferior. After further studies, they found that silica absorbs the acrylate-based monomer and shear is likely to be added, thereby shortening kneading time and improving kneadability. Accordingly, they found that the above-noted object can be achieved when an ultraviolet crosslinking composition containing EPDM, acrylate-based monomer, silica and a photopolymerization initiator is used as a material for forming a protector layer and a protector layer is formed by irradiating ultraviolet rays thereto, thereby reaching the present invention.

Acrylate-based monomer includes methacrylic monomer, in addition to acrylic monomer, in the present invention.

Moreover, the kneading of a composition becomes preferable as the mixing ratio of each component in the ultraviolet crosslinking composition is within a predetermined range, thus improving the transparency of the protector layer and the flexibility of the fuel hose.

Furthermore, when a resorcinol-based compound (component E) and melamine resin (component F), in addition to the above-mentioned components A to D, are used together, the resorcinol-based compound (component E) operates mainly as an adhesive. At the same time, the melamine resin (component F) operates mainly as an adhesive aid. Thus, the resinous inner layer can be bonded to the protector layer with further strength, preventing the exposure of a hose end due to the slippage of layers during bend processing or a connector press-in process. Moreover, even when a thin layer is formed by using a material which loses significant mechanical and barrier properties due to moisture, such as polyamide resin, ethylene-vinyl alcohol copolymer (EVOH), metal or the like, on the outer peripheral surface of the resinous inner layer, a fuel hose with excellent adhesive strength between each thin layer and a protector layer can be provided.

The embodiments of the present invention will be explained in detail.

An example of the method of manufacturing a fuel hose of the present invention will be explained based on FIG. 1.

In other words, a resin material is first extruded by an extrusion molding machine 3 and then cooled if necessary, thus forming a resinous inner layer 1. Then, the subject ultraviolet crosslinking composition 5 is extruded onto the surface of the resinous inner layer 1 by an extrusion molding machine 4. Subsequently, ultraviolet rays are irradiated from an ultraviolet lamp 6 to polymerize the subject ultraviolet crosslinking composition 5, thus forming a protector layer 2. The resultant product is wound into a roll shape. A hose is then cut therefrom into the necessary length, thereby manufacturing a fuel hose as shown in FIG. 2 in which the protector layer 2 is formed on the outer peripheral surface of the resinous inner layer 1. In FIG. 1, reference numeral 7 indicates a roller.

There is no particular limitation on the material for forming the resinous inner layer 1. The material may include, for instance, fluorine resin, polyamide resin, polyester resin, polyolefine resin, and the like. The material may be used alone or with two or more kinds of the above.

The fluorine resin may include, for instance, polyvinylidene fluoride (PVDF), polychlorotrifluoroethylene (CTFE), ethylene-chlorotrifluoroethylene copolymer (ECTFE), ethylene-tetrafluoroethylene copolymer (ETFE), hexafluoropropylene-tetrafluoroethylene copolymer (FEP), fluoroalkoxyethylene resin (PFA), polytetrafluoroethylene (PTFE), and so forth.

The polyamide resin is not particularly limited to aliphatic, aromatic resins and the like. The polyamide resin may include, for instance, lactam polymer, a condensate of diamine and dicarboxylic acid, amino acid polymer, copolymers as well as blends thereof, and the like. Specifically, it is preferable to use Nylon 6, Nylon 11, Nylon 12, Nylon 610, Nylon 612, copolymers of Nylon 6 and Nylon 66, blends of two or more kinds thereof, and the like.

The polyester resin can be obtained by a conventional method, for instance, the polycondensation of a polyhydric alcohol such as diol and a polybasic acid such as dicarboxylic acid. The above-noted diol may include, for example, ethylene glycol, propylene glycol, 1,4-butanediol, neopentyl glycol, cyclohexanediol, xylylene glycol, hexahydroxylene glycol, bis(4-β-hydroxyetoxyphenyl)sulfone, and so forth. The above-noted dicarboxylic acid may include, for example, an aromatic dicarboxylic acid such as terephthalic acid, isophthalic acid, phthalic acid, 2,6-naphthalenedicarboxylic acid, 4,4'-diphenyleneetherdicarboxylic acid, and so forth; and/or an aliphatic dicarboxylic acid such as malonic acid, succinic acid, glutaric acid, adipic acid, sebacic acid, undecanoic diacid, dodecanoic diacid, tridecanoic diacid, tetradecanoic diacid, hexadecanoic diacid, hexadecenoic diacid, octadecanoic diacid, octadecenoic diacid, eicosanoic diacid, eicosenoic diacid, 1,10-dodecanedicarboxylic acid, and so forth; and the like. It is preferable to use polybutylene terephthalate which is obtained by the polycondensation of 1,4-butanediol and terephthalic acid, among them.

The polyolefin resin includes, for instance, polyethylene (PE), polypropylene (PP), and so forth.

The subject ultraviolet crosslinking composition which can be the material for forming the protector layer 2, can be obtained by using ethylene-propylene-diene rubber (component A), acrylate-based monomer (component B), silica (component C), and a photopolymerization initiator (component D).

The ethylene-propylene-diene rubber (abbreviated as EPDM hereinafter) (component A) is not particularly limited. However, its Mooney viscosity at 100° C. is preferably 30 to less than 110, and more preferably, 35 to less than 110.

When the Mooney viscosity is less than 30, extrusion molding becomes difficult. To the contrary, when the Mooney viscosity is 110 or more, kneadability is poor and processing becomes difficult. Additionally, when the Mooney viscosity is too high, it is possible to use oil extended EPDM in which paraffin oil or the like has been mixed so as to adjust the viscosity within the above-noted range.

The above-mentioned acrylate-based monomer (component B) is not particularly limited, and may include a monofunctional monomer and/or a multifunctional monomer. However, when there are many functional groups in the monomer and the viscosity is higher, hardening is generally faster and modifying effects are obtained with a smaller quantity. Thus, a multifunctional monomer is preferable.

Monofunctional monomers include the ones expressed in the following Formula 1 and Formula 2.

$$A\text{—}O\text{—}R^1 \quad \text{Formula 1}$$

wherein A is $CH_2=CHCO-$ or $CH_2=C(CH_3)CO-$; and $R^1$ is an alkyl group or a cyclohexyl group.

The monofunctional monomers expressed in the above-mentioned Formula 1, specifically, include 2-ethylhexylacrylate (EHA), cyclohexylacrylate, n-butylacrylate, and the like.

$$A\text{—}R^2\text{—}O\text{—}R^3 \quad \text{Formula 2}$$

wherein $R^2$ is $-(OCH_2CH_2)_{\overline{n}}$ or $$-(OCH_2CH)_n-\!\!\!\!\!\!\!\!\!\!\!\!\!\!\!\!\!\!\!\!\!\!\!\!\!\!\!\!\!\!\!\!\!\!\!\!\!\!\!\underset{CH_3}{|}$$

and n is an integer from 1 to 14; $R^3$ is a methyl group or an ethyl group; and A is the same as in Formula 1 mentioned above.

The monofunctional monomers expressed in the above-noted Formula 2, specifically, include methoxydiethylene glycol acrylate, methoxypolyethylene glycol methacrylate, and the like.

Moreover, the multifunctional monomers include, for instance, those expressed in the following Formulas 3 to 7.

$$A\text{—}O\text{—}R^4\text{—}O\text{—}A \quad \text{Formula 3}$$

wherein $R^4$ is an alkylene group, and A is the same as in Formula 1 mentioned above.

The multifunctional monomers expressed in the above-noted Formula 3, specifically, include 1,4-butanediol diacrylate, neopentyl glycol diacrylate, and the like.

$$A\text{—}O\text{—}R^2\text{—}O\text{—}A \quad \text{Formula 4}$$

wherein A is the same as in Formula 1 mentioned above, and $R^2$ is the same as in Formula 2 noted above.

The multifunctional monomers expressed in the above-noted Formula 4, specifically, include ethylene glycol diacrylate (EGDA), ethylene glycol dimethacrylate (EGDMA), diethylene glycol diacrylate, diethylene glycol dimethacrylate, and the like.

Formula 5

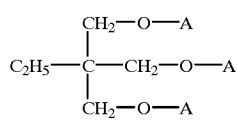

wherein A is the same as in Formula 1 mentioned above.

The multifunctional monomers expressed in Formula 5, specifically, include trimethylol propane triacrylate (TMPTA), trimethylol propane trimethacrylate (TMPTMA), and the like.

Formula 6

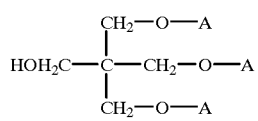

wherein A is the same as in Formula 1 mentioned above.

The multifunctional monomers expressed in the above-noted Formula 6, specifically, include pentaerythritol triacrylate, and the like.

Formula 7

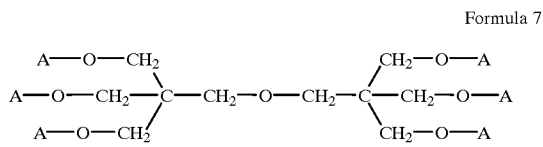

wherein A is the same as in Formula 1 mentioned above.

The multifunctional monomers expressed in the above-noted Formula 7, specifically, include dipentaerythritol hexaacrylate, and the like.

The mixing ratio of EPDM (component A) and acrylate-based monomer (component B) mentioned above is preferably in the range of component A/component B=95/5 to 60/40, more preferably, component A/component B=95/5 to 70/30, in weight ratios. When the weight ratio of component B is less than 5, the modifying effects of EPDM (component A) are few. To the contrary, when the weight ratio of component B exceeds 40, flexibility is lost.

The mixing ratio of silica (component C) that is used along with EPDM (component A) and acrylate-based monomer (component B) mentioned above, is preferably within the range of 5 to 60 weight parts, more preferably, 10 to 50 parts relative to the total of 100 weight parts (mentioned as parts hereinafter) of the total of component A and component B. When the mixing ratio of the silica (component C) is less than 5 parts, it becomes difficult to knead component A and component B. To the contrary, when the mixing ratio exceeds 60 parts, it becomes difficult to knead these components and flexibility is lost.

Silica (component C) mentioned above preferably has an average particle size of less than 20 nm, more preferably, 15 to 20 nm. When the average particle size of silica (component C) exceeds 20 nm, the protector layer tends to lose transparency.

Photopolymerization initiators (component D) that are used along with EPDM (component A), acrylate-based monomer (component B) and silica (component C), include, for instance, benzophenone, benzyl (dibenzoyl), benzyl dimethyl ketal, benzoin methyl ether, benzoin ethyl ether, benzoin butyl ether and the like, which are cleaved by ultraviolet (UV) radiation and generate radicals. The initiator may be used alone or with two or more kinds thereof. Because of its thermal stability, benzyl dimethyl ketal is preferable among them.

The mixing ratio of the photopolymerization initiator (component D) is preferably within the range of 1 to 5 parts, more preferably, 1 to 3 parts relative to the total of 100 parts of EPDM (component A) and acrylate-based monomer (component B) mentioned above. When the mixing ratio of the photopolymerization initiator (component D) is less than 1 part, crosslinking efficiency decreases. To the contrary, when the mixing ratio exceeds 5 parts, the stability of a composition becomes poor.

In addition to the components A to D, it is preferable to mix a resorcinol-based compound (component E) and melamine resin (component F) to the subject ultraviolet crosslinking composition.

The resorcinol-based compound (component E) is not particularly limited as long as it functions mainly as an adhesive. For instance, modified resorcinol-formaldehyde resin, resorcinol, resorcinol-formaldehyde (RF) resin, and the like are suitable. The resorcinol-based compound may be used alone or with two or more kinds thereof. Among them, modified resorcinol-formaldehyde resin is preferable because of its low transpiration and low moisture absorption properties and compatibility with rubber.

Modified resorcinol-formaldehyde resin include the ones expressed in the following Formulas 8 to 10. Among these, the one in Formula 8 is particularly preferable.

Formula 8

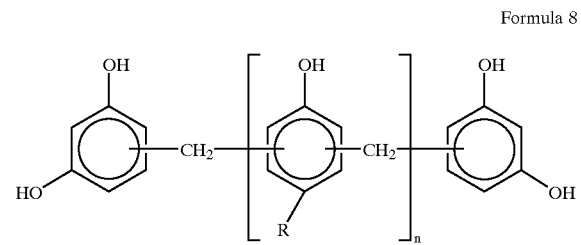

wherein R is a hydrocarbon group, and n is a positive number.

Formula 9

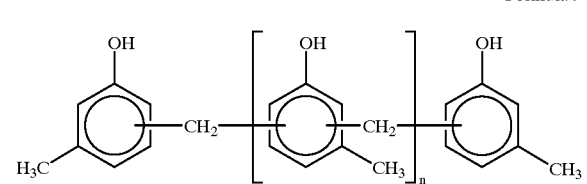

wherein n is a positive number.

Formula 10

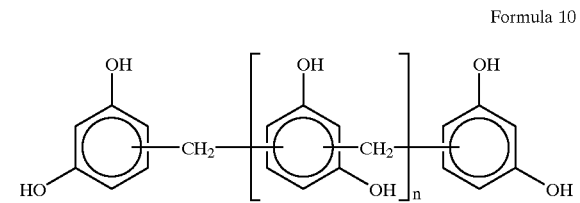

wherein n is a positive number.

The mixing ratio of the resorcinol-based compound (component E) is preferably within the range of 0.1 to 10 parts, more preferably, 0.5 to 5 parts relative to the total of 100 parts of the specific rubber (component A) and acrylate-based monomer (component B) mentioned above. When component E is less than 0.1 part, adhesiveness with the resinous inner layer lessens. To the contrary, when component E exceeds 10 parts, adhesiveness is saturated and adhesive strength is stabilized. Thus, even if the mixing ratio of component E is increased, costs would increase and further effects could not be expected.

The above-mentioned melamine resin (component F) works mainly as an adhesive aid and is not particularly limited. For example, a methylated product of formaldehyde-melamine polymer, hexamethylenetetramine, and the like are included. The melamine resin may be used alone or with two or more kinds thereof. Among them, the methylated product of formaldehyde-melamine polymer is preferable because of its low transpiration and low moisture absorption properties and compatibility with rubber.

As the methylated product of formaldehyde-melamine polymer mentioned above, the one expressed in the following Formula 11, for instance, is preferable.

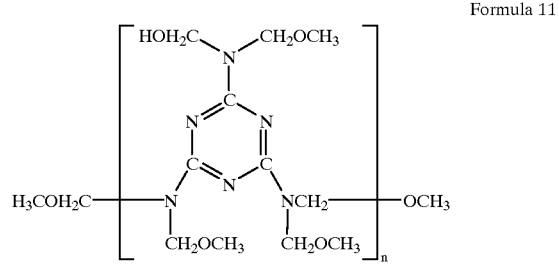

Formula 11 wherein n is a positive number.

Among the above-noted melamine resins (component F), a mixture of the compounds in Formula 11 is more preferable. A mixture of 43 to 44 wt. % of the compound wherein n=1, 27 to 30 wt. % of the compound wherein n=2, and 26 to 30 wt. % of the compound wherein n=3, is particularly preferable.

The mixing ratio of the resorcinol-based compound (component E) and melamine resin (component F) is preferably component E/component F=1/0.5 to 1/2 more preferably, component E/component F=1/0.77 to 1/1.5 in weight ratios. When the weight ratio of component F is less than 0.5, the tensile strength at breakage (TB), elongation at breakage (EB) and the like of a protector layer tend to deteriorate slightly. To the contrary, when the weight ratio of component F exceeds 2, adhesiveness is saturated and adhesive strength stabilizes. Thus, even if the weight ratio of component F is increased further, costs would increase and further effects could not be expected.

In addition to each component E and F mentioned above, a flame retardant, a plasticizer such as process oil, a processing aid, and/or a crosslinking accelerator such as a silane coupling agent may be mixed into the subject ultraviolet crosslinking composition at an appropriate amount if necessary.

The above-noted components A to D and, if necessary, other components, are mixed and then kneaded by a kneading machine such as a roll, a kneader and a Banbury mixer so as to prepare the subject ultraviolet crosslinking composition.

Conditions for irradiating ultraviolet rays by the ultraviolet lamp 6 may vary considerably depending on kinds, ratios and so forth of each component used for the protector layer 2. However, the dosage of ultraviolet rays is normally within the range of 1,000 to 20,000 mJ/cm$^2$, preferably, 5,000 to 15,000 mJ/cm$^2$.

FIG. 1 was explained as a method for manufacturing a fuel hose which does not require a mandrel. However, a fuel hose can also be manufactured by supplying a mandrel to the extrusion molding machine 3 from a mandrel feed device, forming the resinous inner layer 1 and the protector layer 2 on the mandrel and then extracting the mandrel.

In the explanation of FIG. 1, a resinous inner layer is first formed by extrusion molding, and an ultraviolet crosslinking composition for a protector layer is then extrusion-molded on the outer peripheral surface thereof. However, it is possible to extrusion-mold both the material for forming the resinous inner layer and the ultraviolet crosslinking composition for the protector layer at the same time.

In the fuel hose of the present invention obtained as described above, the resinous inner layer 1 normally has a thickness of 0.1 to 1.5 mm, preferably, 0.3 to 1.0 mm. The protector layer 2 normally has a thickness of 1 to 5 mm, preferably, 1.5 to 3 mm.

The resinous inner layer 1 is not limited to a single layer structure, and may have a multi-layer structure with two or more layers. For example, a polyamide resin thin layer, an EVOH thin layer, a metal foil (SUS foil) and the like may be formed on the outermost surface of the resinous inner layer 1. Moreover, a reinforcing layer or the like and made of woven reinforcing threads may be provided between the resinous inner layer 1 and the protector layer 2.

The fuel hose of the present invention is not limited in its shapes and it may be either a long hose or a short hose and can be molded in a bellows shape.

The fuel hose of the present invention obtained as described above is preferably used as a fuel hose for a car such as a feed hose, a return hose, a breather hose, an evaporator hose and a filler hose.

DESCRIPTION OF THE PREFERRED EMBODIMENTS

Figure 1:
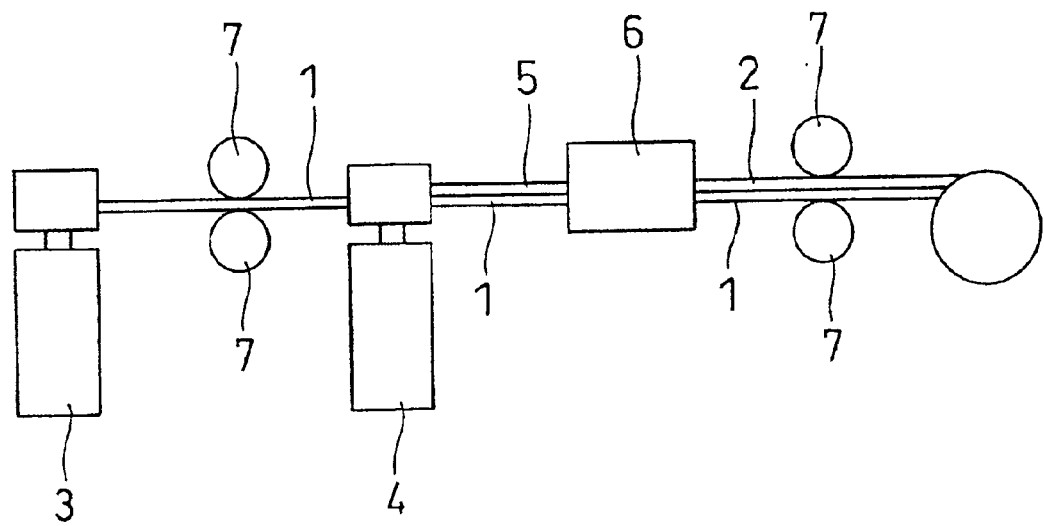
FIG. 1 is a flow diagram, showing an embodiment of the method of manufacturing a fuel hose of the present invention.
Figure 2:
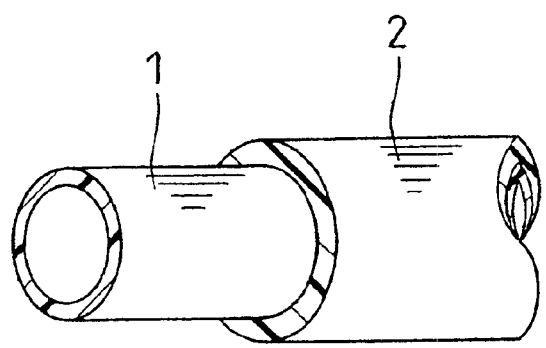
FIG. 2 is a sectional perspective view, showing an embodiment of a fuel hose obtained by the method for manufacturing the present invention.

Subsequently, examples will be explained along with comparative examples.

Prior to preparation of the examples and comparative examples, the following materials were prepared.

EPDM (Component A)

(1) Mooney viscosity (100° C.) 8

(2) Mooney viscosity (100° C.) 75

(3) Mooney viscosity (100° C.) 105

(4) Oil extended EPDM containing paraffin oil at about 9 wt. % (Mooney viscosity (100° C.) 85)

(5) Mooney viscosity (100° C.) 110

Acrylate-based Monomer (Component B)

2-ethylhexylacrylate (EHA)

ethylene glycol dimethacrylate (EGDMA)

polyethylene glycol diacrylate (PEGDA)

trimethylol propane triacrylate (TMPTA)

trimethylol propane trimethacrylate (TMPTMA)
Silica (Component C)
NIPSIL VN 3 manufactured by Nippon Silica Kabushiki Kaisha (average particle size: 16 nm)
Photopolymerization Initiator (Component D)
benzyl dimethyl ketal
Resorcinol-based Compound (Component E)
modified resorcinol-formaldehyde resin in Formula 8 above (Sumikanol 620 manufactured by Sumitomo Chemical Co., Ltd.)
Melamine Resin (Component F)
methylated product of formaldehyde-melamine polymer (Sumikanol 507A manufactured by Sumitomo Chemical Co., Ltd.)

EXAMPLE 1

First, Nylon 12 was prepared as a material for forming a resinous inner layer, and was extruded by an extrusion molding machine, thus forming the resinous inner layer. Subsequently, each component shown in Table 1 below was mixed at a ratio shown in the table, and was kneaded by a roll to prepare a composition for forming a protector layer. Then, the composition for a protector layer was extruded onto the surface of the resinous inner layer by an extrusion molding machine. Ultraviolet rays were irradiated from an extra-high pressure mercury lamp (ORC HMW532D manufactured by Oak Seisakusho K.K.) to polymerize the composition for forming a protector layer, thus forming the protector layer. Accordingly, a fuel hose (inner diameter of 6 mm, and length of 30 m) formed with the protector layer (thickness of 2 mm) at the outer peripheral surface of the resinous inner layer (thickness of 1 mm) was obtained.

EXAMPLES 2 TO 11

COMPARATIVE EXAMPLES 1 TO 7

A fuel hose was produced as in Example 1, except that the mixing components, mixing ratios and the like of the composition for a protector layer were changed as shown in Tables 1 to 3 set forth below.

The fuel hoses of the Examples and Comparative Examples were evaluated as to various characteristics based on the following standards. The results are shown in the following Tables 1 to 3.

Kneadability

Kneadability of the composition for the protector layer was evaluated based on the sense of a worker. In other words, when each component did not wind around a roll or did not integrate into one, the evaluation was x. When such phenomenon was not found, the evaluation was ○.

Tensile Stress, Tensile Strength at Breakage, Elongation at Breakage

Tensile stress ($M_{100}$), tensile strength at breakage (TB) and elongation at breakage (EB) when the protector layer was elongated by 100% were measured on the basis of JIS K 6251.

Tear Strength

Tear strength (Tr) of the protector layer was measured based on the tensile test described in JIS K 6252 (B-type test piece).

Heat Aging Test

After a heat aging test at 100° C. for 168 hours, $M_{100}$, TB and EB of the protector layer were measured as described above.

Flexibility

The fuel hose was wound around a cylinder (60 mm in diameter) after the heat aging test conducted at 100° C. for 168 hours, and the flexibility of the fuel hose was evaluated. When the surface of the protector layer of the fuel hose had no abnormality such as cracks, the evaluation was ○. When the surface of the protector layer had an abnormality such as cracks, the evaluation was x.

Clip Detachability

Figure 3:
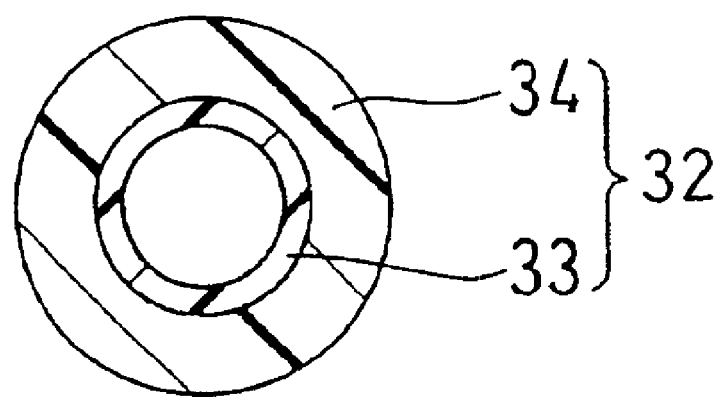
FIG. 3 is explains the evaluation of clip detachability.
Figure 3:
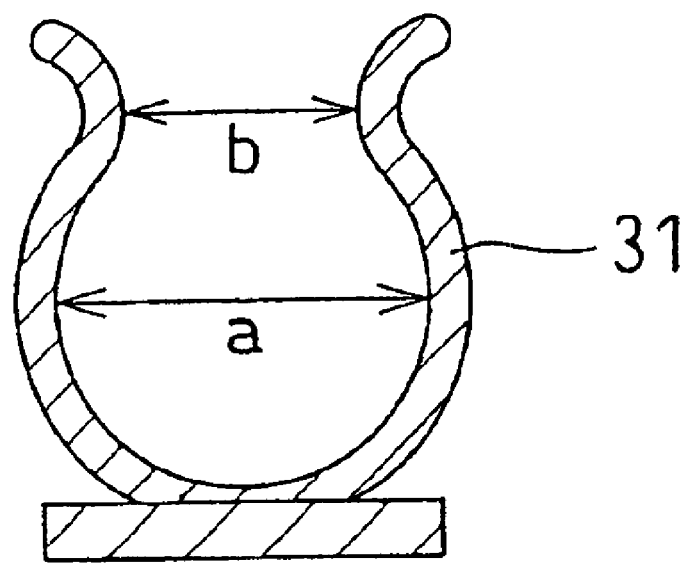

As shown in FIG. 3, a resinous clip 31 (8 mm in length) having an inside diameter of 14 mm and an open part b of 9 mm, was prepared. After a fuel hose 32 was fitted into the clip, the fuel hose 32 was detached from the clip 31 and clip detachability was evaluated. When the protector layer 34 of a fuel hose 32 had no abnormality such as scratches, the evaluation was ○. When the protector layer 34 had an abnormality such as scratches, the evaluation was x. In the figure, reference numeral 33 indicates the resinous inner layer.

TABLE 1

|  | Examples | | | | | |
|---|---|---|---|---|---|---|
|  | 1 | 2 | 3 | 4 | 5 | 6 |
| EPDM (2) | 95 | 95 | 90 | 80 | 70 | 80 |
| EGDMA | — | — | — | — | 30 | — |
| PEGDA | — | — | — | — | — | 20 |
| TMPTA | 5 | 5 | — | — | — | — |
| TMPTMA | — | — | 10 | 20 | — | — |
| Silica | 5 | 50 | 50 | 50 | 50 | 50 |
| Photopolymerization initiator | 3 | 3 | 3 | 3 | 3 | 3 |
| Kneadability | ○ | ○ | ○ | ○ | ○ | ○ |
| UV dosage (mJ/cm$^2$) | 6000 | 6000 | 6000 | 6000 | 6000 | 6000 |
| Initial |  |  |  |  |  |  |
| $M_{100}$ (MPa) | 2.9 | 3.8 | 2.8 | 5.7 | 3.8 | 3.0 |
| TB (MPa) | 7.9 | 8.0 | 8.2 | 7.5 | 8.9 | 7.3 |
| EB (%) | 320 | 250 | 350 | 200 | 300 | 280 |
| Tr (N/mm) | 38.5 | 50.2 | 34.1 | 47.5 | 37.8 | 35.3 |
| After heat aging |  |  |  |  |  |  |
| $M_{100}$ (MPa) | 3.2 | 4.4 | 3.7 | 8.6 | 4.2 | 3.4 |
| TB (MPa) | 6.2 | 6.8 | 10.0 | 9.4 | 9.5 | 8.3 |
| EB (%) | 260 | 200 | 290 | 150 | 260 | 230 |
| Flexibility | ○ | ○ | ○ | ○ | ○ | ○ |
| Clip detachability | ○ | ○ | ○ | ○ | ○ | ○ |

(in parts)

TABLE 2

|  | Examples | | | | | Comparative Example |
|---|---|---|---|---|---|---|
|  | 7 | 8 | 9 | 10 | 11 | 1 |
| EPDM (1) | — | — | — | — | — | 90 |
| EPDM (2) | — | — | — | — | — | — |
| EPDM (3) | 60 | 85 | 85 | — | 85 | — |
| EPDM (4) | — | — | — | 85 | — | — |
| EHA | 40 | — | — | — | — | — |
| TMPTA | — | 15 | — | 15 | 15 | — |
| TMPTMA | — | — | 15 | — | — | 10 |
| Silica | 60 | 50 | 50 | 50 | 50 | — |
| Photopolymerization initiator | 5 | 3 | 3 | 3 | 3 | 2 |
| Resorcinol-based compound | — | — | — | — | 3 | — |
| Melamine resin | — | — | — | — | 1.54 | — |

TABLE 2-continued

|  | Examples | | | | | Comparative Example |
|---|---|---|---|---|---|---|
|  | 7 | 8 | 9 | 10 | 11 | 1 |
| Kneadability | ○ | ○ | ○ | ○ | ○ | X |
| UV dosage (mJ/cm$^2$) | 6000 | 6000 | 6000 | 6000 | 6000 | 9000 |
| Initial |  |  |  |  |  |  |
| $M_{100}$ (MPa) | 8.6 | 6.8 | 3.6 | 3.7 | 7.2 | 0.4 |
| TB (MPa) | 10.4 | 11.6 | 8.2 | 5.6 | 10.5 | 1.1 |
| EB (%) | 200 | 200 | 300 | 200 | 190 | 450 |
| Tr (N/mm) | 48.0 | 55.3 | 39.6 | 42.1 | 52 | 7.0 |
| After heat aging |  |  |  |  |  |  |
| $M_{100}$ (MPa) | 9.3 | 8.2 | 4.8 | 4.8 | 8.3 | 0.7 |
| TB (MPa) | 11.3 | 12.5 | 10.2 | 9.8 | 11.0 | 0.8 |
| EB (%) | 180 | 190 | 240 | 210 | 190 | 110 |
| Flexibility | ○ | ○ | ○ | ○ | ○ | X |
| Clip detachability | ○ | ○ | ○ | ○ | ○ | X |

(in parts)

TABLE 3

|  | Comparative Examples | | | | | |
|---|---|---|---|---|---|---|
|  | 2 | 3 | 4 | 5 | 6 | 7 |
| EPDM (2) | 100 | 95 | 50 | — | 100 | 90 |
| EPDM (5) | — | — | — | 90 | — | — |
| TMPTA | — | 3 | 50 | 10 | — | 10 |
| Silica | — | — | — | — | 70 | — |
| Photopolymerization initiator | 3 | 3 | 3 | 3 | 3 | 1 |
| Kneadability | X | X | Impossible | Impossible | X | X |
| UV dosage (mJ/cm$^2$) | 6000 | 6000 | — | — | 6000 | 0 |
| Initial |  |  |  |  |  |  |
| $M_{100}$ (MPa) | 0.6 | 0.5 | — | — | 0.8 | 0.4 |
| TB (MPa) | 1.6 | 1 | — | — | 0.7 | 0.5 |
| EB (%) | 700 | 600 | — | — | 200 | 800 |
| Tr (N/mm) | 8.0 | 10.0 | — | — | 8.7 | 7.2 |
| After heat aging |  |  |  |  |  |  |
| $M_{100}$ MPa) | 0.6 | 0.7 | — | — | 1.4 | — |
| TB (MPa) | 1.2 | 1.5 | — | — | 1.2 | — |
| EB (%) | 650 | 500 | — | — | 80 | — |
| Flexibility | ○ | ○ | — | — | X | ○ |
| Clip detachability | X | X | — | — | X | X |

(in parts)

According to the above results, kneadability of the composition for forming the protector layer was preferable in all the fuel hoses of the Examples. The properties ($M_{100}$, TB, EB, Tr) of the protector layers (initial properties and properties after heat aging) were superior. Flexibility and clip detachability were also excellent.

To the contrary, the composition for forming the protector layer in the fuel hoses of Comparative Examples 1 to 3 had poor kneadability since silica was not included. It was also found that the initial properties and properties after heat aging of the protector layers were poor. In Comparative Example 4, silica was not included and the mixing ratio of the acrylate-based monomer (TMPTMA) was too high, so that kneading was impossible and a protector layer could not be formed. In Comparative Example 5, silica was not included and the Mooney viscosity of EPDM was too high, so that kneading was impossible and a protector layer could not be formed. In Comparative Example 6, the mixing ratio of silica was too high, so that the kneadability of the composition for a protector layer was inferior. Additionally, since the acrylate-based monomer was not included, the initial properties and properties after heat aging of the protector layer were poor. In Comparative Example 7, silica was not included, so that the kneadability of the composition for the protector layer was poor. Moreover, as ultraviolet rays were not irradiated, the initial properties and properties after heat aging of the protector layer were inferior.

EXAMPLE 12

First, Nylon 6 (UBE Nylon 1030B manufactured by Ube Industries, Ltd.) was prepared as a material for forming a resinous inner layer, and was extruded by an extrusion molding machine to form the resinous inner layer. Each component shown in Table 4 below was mixed at a ratio shown in the table, and was kneaded by a roll to prepare a composition for a protector layer (the same mixing composition as in Example 8). Then, the composition for a protector layer was extruded onto the resinous inner layer by an extrusion molding machine. Ultraviolet rays were irradiated from an extra-high pressure mercury lamp (ORC HMW532D manufactured by Oak Seisakusho K.K.) to polymerize the composition for the protector layer, thus forming the protector layer. Accordingly, a fuel hose (inner diameter of 6 mm, and length of 30 m) formed with the protector layer (thickness of 2 mm) on the surface of the resinous inner layer (thickness of 50 μm) was obtained.

EXAMPLE 13

A fuel hose was produced as in Example 12, except that Nylon 6 (UBE Nylon 1024JI manufactured by Ube Industries, Ltd.) and EVOH were prepared as materials for forming a resinous inner layer and these two layers were both extruded by an extrusion molding machine to form a two-layered resinous inner layer, in which an EVOH thin layer (thickness of 50 μm) was formed on the outer peripheral surface of a Nylon 6 layer (thickness of 450 μm).

EXAMPLE 14

A resinous inner layer was formed as in Example 12. A fuel hose was produced as in Example 12, except that a SUS foil (SUS304) was formed at the thickness of 50 μm by using an adhesive (Hibon manufactured by Hitachi Kasei Polymer Co.) on the surface of the resinous inner layer. The adhesive was used, not only for bonding the resinous inner layer and the SUS foil, but also for lapping the SUS foils.

EXAMPLE 15

A composition for a protector layer (the same mixing composition as in Example 11) was prepared as in Example 12, except that a resorcinol-based compound and melamine resin were also included. Then, a fuel hose was produced as in Example 12 using this composition as a protector layer.

EXAMPLE 16

A composition for a protector layer (the same mixing composition as in Example 11) was prepared as in Example 12, except that a resorcinol-based compound and melamine resin were also included. Then, a fuel hose was produced as in Example 13 using this composition as a protector layer.

EXAMPLE 17

A composition for a protector layer (the same mixing composition as in Example 11) was prepared as in Example 12, except that a resorcinol-based compound and melamine resin were also included. Then, a fuel hose was produced as in Example 14 using this composition for a protector layer.

The adhesive strength between a resinous inner layer and a protector layer was tested for the fuel hoses in Examples 12 to 17. In particular, the fuel hoses were cut into 10 mm-thick circular slices, and were set on a tensile test machine (JIS B 7721). The resinous inner layer was fixed, and the protector layer was pulled at the speed of 50 mm per minute and the strength (N/cm) thereof was measured. The results are shown in Table 4 below.

TABLE 4

|  | Examples | | | | | |
| --- | --- | --- | --- | --- | --- | --- |
|  | 12 | 13 | 14 | 15 | 16 | 17 |
| EPDM (3) | 85 | 85 | 85 | 85 | 85 | 85 |
| TMPTA | 15 | 15 | 15 | 15 | 15 | 15 |
| Silica | 50 | 50 | 50 | 50 | 50 | 50 |
| Photopolymerization initiator | 3 | 3 | 3 | 3 | 3 | 3 |
| Resorcinol-based compound | — | — | — | 3 | 3 | 3 |
| Melamine resin | — | — | — | 1.54 | 1.54 | 1.54 |
| Adhesive strength (N/cm) | 1 | 2 | 1 | 18 | 23 | 20 |

(in parts)

It can be understood from Table 4 above that Examples 15 to 17 in which a resorcinol-based compound and melamine resin were included in the composition for a protector layer, show superior adhesive strength to Examples 12 to 14 in which these components were not included with the composition. The reasons can be surmised as follows. The resorcinol-based compound functions mainly as an adhesive, and the melamine resin functions mainly as an adhesive aid. $CH_2O$ is provided from the melamine resin to the resorcinol-based compound, and the compound bonds to a polyamide bond (—CONH—) of polyamide resin or to EVOH or a SUS material through covalent bonding, thus improving adhesive strength. For instance, a resorcinol-based compound expressed in the following Formula E obtains $CH_2O$ from melamine resin. Thus, the compound becomes the one shown in the following Formula E', which bonds to a polyamide bond (—CONH—) of polyamide resin through covalent bonding as shown in the following reaction formula and forms strong adhesion. Moreover, a section of hydroxyl groups of the resorcinol-based compound is bonded to a polyamide bond of polyamide resin through a hydrogen bond, and it is believed that the hydrogen bond also improves adhesion.

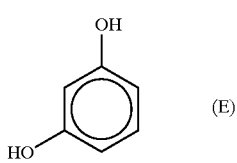

Formula 12

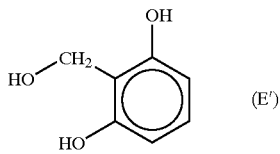

Formula 13

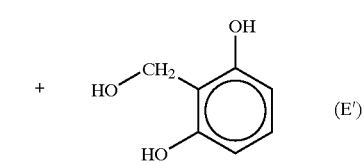

Formula 14

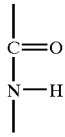

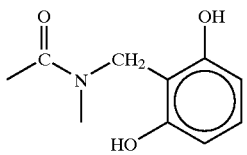

As described above, the fuel hose of the present invention is manufactured by extruding the subject ultraviolet crosslinking composition which contains EPDM (component A), acrylate-based monomer (component B), silica (component C) and photopolymerization initiator (component D), onto the outer peripheral surface of a resinous inner layer; and then irradiating ultraviolet rays to polymerize the ultraviolet crosslinking composition and thus form a protector layer. Accordingly, unlike conventional vulcanized rubbers, a heating and vulcanizing step is unnecessary, and continuous production becomes possible. Thus, fuel hoses can be quite efficiently produced. Moreover, since the protector layer contains EPDM (component A) as a main component, the fuel hose has flexibility as good as that of vulcanized rubbers, and also the fuel hose has excellent heat resistance. Moreover, since the protector layer of the fuel hose is transparent, problems such as kinks can be found early during shipping and assembling.

Furthermore, by having the mixing ratio of each component of the ultraviolet crosslinking composition within a predetermined range, the composition is preferably kneaded, and the transparency of the protector layer and the flexibility of the fuel hose improve.

When a resorcinol-based compound (component E) and melamine resin (component F) are included in addition to the above-noted components A to D, the resorcinol-based compound (component E) functions mainly as an adhesive and the melamine resin (component F) functions mainly as an adhesive aid. Thus, adhesion between the resinous inner layer and the protector layer becomes stronger, thus preventing the exposure of a hose end due to the slippage of layers during a bend processing or a connector press-in process. Moreover, even when a thin layer is formed using a material which loses significant mechanical and barrier properties due to moisture, such as polyamide resin, ethylene-vinyl alcohol copolymer (EVOH), metal or the like, on an outer peripheral surface of the resinous inner layer, a fuel hose with excellent adhesive strength between each thin layer and the protector layer can be obtained.

What is claimed is:

1. A method for manufacturing a fuel hose to form a protector layer on an outer peripheral surface of a resinous inner layer, comprising the steps of extruding an ultraviolet crosslinking composition for a protector layer which contains the following components A to F, onto the outer peripheral surface of the resinous inner layer; and irradiating ultraviolet rays to polymerize the ultraviolet crosslinking composition, thus forming a protector layer:

(A) ethylene-propylene-diene rubber;
(B) acrylate-based monomer;
(C) silica;
(D) photopolymerization initiator;
(E) resorcinol-based compound; and
(F) melamine resin.

2. The method according to claim 1, wherein a ratio of component A and component B is in a range of component A/component B=95/5 to 60/40 in weight ratios; a ratio of component C, relative to a total of 100 weight parts of component A and component B, is in a range of 5 to 60 weight parts; and a ratio of component D, relative to a total of 100 weight parts of component A and component B, is in a range of 1 to 5 weight parts.

3. The method according to claim 2, wherein a ratio of component E and component F is in a range of component E/component F=1/0.5 to 1/2 in weight ratios.

4. The method according to claim 2, wherein a ratio of the component E is in a range of 0.1 to 10 weight parts relative to a total of 100 weight parts of the component A and component B.

5. The method according to claim 3, wherein a ratio of the component E is in a range of 0.1 to 10 weight parts relative to a total of 100 weight parts of the component A and component B.

6. The method according to claim 1, wherein a ratio of component E and component F is in a range of component E/component F=1/0.5 to 1/2 in weight ratios.

7. The method according to claim 6, wherein a ratio of the component E is in a range of 0.1 to 10 weight parts relative to a total of 100 weight parts of the component A and component B.

8. The method according to claim 1, wherein a ratio of the component E is in a range of 0.1 to 10 weight parts relative to a total of 100 weight parts of the component A and component B.

* * * * *